United States Patent
Brunner

(10) Patent No.: US 11,542,993 B2
(45) Date of Patent: Jan. 3, 2023

(54) FREEWHEEL

(71) Applicant: Dr. Ing. h.c. F. Porsche Aktiengesellschaft, Stuttgart (DE)

(72) Inventor: Michael Brunner, Renningen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 17/363,186

(22) Filed: Jun. 30, 2021

(65) Prior Publication Data

US 2022/0003280 A1 Jan. 6, 2022

(30) Foreign Application Priority Data

Jul. 1, 2020 (DE) ...................... 10 2020 117 323.7

(51) Int. Cl.
*F16D 41/14* (2006.01)
*B60K 17/26* (2006.01)

(52) U.S. Cl.
CPC .............. *F16D 41/14* (2013.01); *B60K 17/26* (2013.01); *F16H 2200/0021* (2013.01); *F16H 2200/0034* (2013.01); *F16H 2200/2079* (2013.01)

(58) Field of Classification Search
CPC ............................ F16D 41/12–16; F16D 41/30
See application file for complete search history.

(56) References Cited

U.S. PATENT DOCUMENTS

| | | | |
|---|---|---|---|
| 6,516,931 B2 * | 2/2003 | Kroger | F16D 41/30 |
| | | | 192/64 |
| 8,042,670 B2 * | 10/2011 | Bartos | F16D 41/14 |
| | | | 192/43.1 |
| 9,541,143 B2 * | 1/2017 | Kimes | F16D 48/064 |
| 9,855,830 B2 | 1/2018 | Knoblauch | |
| 10,151,359 B2 * | 12/2018 | Campton | B60K 23/0808 |
| 10,563,710 B2 * | 2/2020 | Shioiri | F16D 41/14 |
| 10,711,885 B2 * | 7/2020 | Eisengruber | F16H 63/34 |
| 10,955,014 B1 * | 3/2021 | Burke | F16D 41/12 |
| 2017/0074378 A1 | 3/2017 | Kirchner | |
| 2018/0274604 A1 | 9/2018 | Ince | |

FOREIGN PATENT DOCUMENTS

| | | |
|---|---|---|
| DE | 102014117227 A1 | 5/2016 |
| DE | 102015104203 A1 | 9/2016 |
| DE | 102015217521 A1 | 3/2017 |
| DE | 112018001541 T5 | 12/2019 |

* cited by examiner

*Primary Examiner* — Ernesto A Suarez
*Assistant Examiner* — James J Taylor, II
(74) *Attorney, Agent, or Firm* — RatnerPrestia

(57) ABSTRACT

A freewheel for changing a transmission characteristic of a planetary transmission for a motor vehicle transmission. The freewheel has a first ring which has a first blocking contour, a second ring which is rotatable relative to the first ring and which has a second blocking contour, tiltable blocking bodies which can be caused to engage into the first blocking contour and into the second blocking contour, and a switching element for tilting the blocking bodies. The switching element, in a blocking position, clamps the blocking bodies immovably to the first blocking contour and to the second blocking contour, in a freewheel position, allows unidirectional freewheeling, and in an inactive position, holds the blocking bodies down on the first ring so as to be spaced apart from the second ring.

8 Claims, 2 Drawing Sheets

FREEWHEEL

CROSS-REFERENCE TO RELATED APPLICATION

Figure 1:
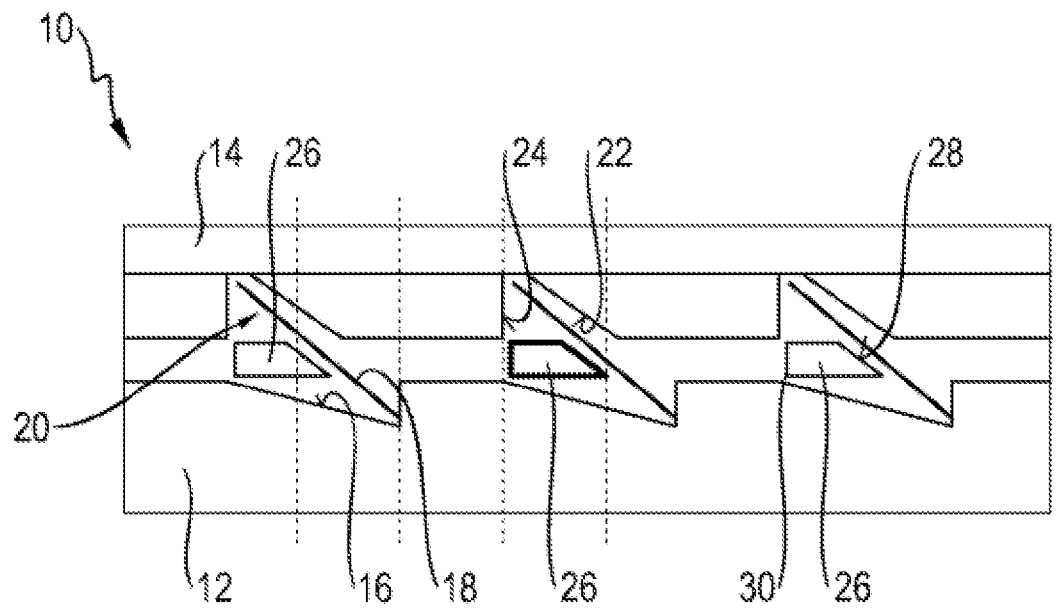

This application claims priority to German Patent Application No. 10 2020 117 323.7, filed Jul. 1, 2020, the content of such application being incorporated by reference herein in its entirety.

FIELD OF THE INVENTION

The invention relates to a switchable freewheel, by means of which the transmission characteristic of a planetary transmission of a motor vehicle transmission can be adapted to different operating situations.

BACKGROUND OF THE INVENTION

DE 10 2014 117 227 A1, DE 10 2015 104 203 A1 and DE 10 2015 217 521 A1, each of which is incorporated by reference herein, each disclose a motor vehicle transmission for converting a torque that is generated by an electric machine.

There is a constant demand to adapt the transmission characteristic of a planetary transmission of a motor vehicle transmission to different operating situations in a simple and structural-space-saving manner.

SUMMARY OF THE INVENTION

Described herein are measures which allow an adaptation of the transmission characteristic of a planetary transmission of a motor vehicle transmission to different operating situations in a simple and structural-space-saving manner.

The invention provides a freewheel for changing a transmission characteristic of a planetary transmission for a motor vehicle transmission, having a first ring which has a first blocking contour, a second ring which is rotatable relative to the first ring and which has a second blocking contour, tiltable blocking bodies which can be caused to engage into the first blocking contour and into the second blocking contour, and a switching element for tilting the blocking bodies, wherein the switching element, in a blocking position, clamps the blocking bodies immovably to the first blocking contour and to the second blocking contour, in a freewheel position, allows unidirectional freewheeling, and in an inactive position, holds the blocking bodies down on the first ring so as to be spaced apart from the second ring.

If the switchable freewheel is used in a planetary transmission of a motor vehicle transmission, in particular instead of a brake, for example in order to selectively, in particular immovably, hold a sun gear or ring gear of the planetary transmission or allow said sun gear or ring gear of the planetary transmission to freewheel, the transmission ratio of the planetary transmission can be easily varied by means of the switching setting of the switching element in the freewheel. When the freewheel holds the corresponding transmission component of the planetary transmission, a different overall transmission ratio takes effect for the planetary transmission than when the freewheel allows said transmission component to rotate freely. In this way, a transmission with 2 gear ratios can be implemented very easily.

The freewheel according to aspects of the invention can however assume not only two but three switching positions. In addition to the inactive position and the freewheel position, the switching element of the freewheel can also assume the blocking position, in which the transmission component that can be held by the freewheel is held not only in the traction direction but also in the overrun direction. Since the planetary transmission can thus, in particular in the case of a simultaneously closed clutch, be immovably blocked, a parking lock function can be realized by means of the additional blocking position and the clutch. For example, the clutch can be automatically closed, and the freewheel automatically moved into the blocking position, when the motor vehicle is parked, which is indicated for example in the case of an automatic transmission by means of a shift into the P setting. By means of the parking lock function realized with the aid of the intentional blocking of the planetary transmission, it is possible to reliably prevent the parked motor vehicle from unintentionally rolling away. No separate blocking of the drivetrain is necessary for this purpose, such that it is also possible for an associated actuator arrangement and sensor arrangement to be omitted. The operating situation of "parking" can thus be replicated in a particularly simple and structural-space-saving manner. As a result of the omission of a separate transmission lock as parking lock, it is furthermore possible for the number of components and the production costs to be reduced. By means of the blocking of the planetary transmission that can be intentionally brought about with the blocking setting, it is possible, with the aid of the freewheel that can be caused to assume three different switching positions, for a simple and structural-space-saving adaptation of the transmission characteristic of a planetary transmission of a motor vehicle transmission to different operating situations to be made possible.

The blocking bodies of the freewheel may be configured in particular as pawls. The blocking body may for example be mounted pivotably at one end on the first ring, in particular within the first blocking contour. It is particularly preferable if a spring element engages on the respective blocking body, in particular in order to automatically push the blocking body into second blocking contour. The first ring and the second ring may for example be configured as rings which are offset coaxially with respect to one another in a radial direction and between which the blocking bodies and a switching finger which protrudes in an axial direction from the switching ring may be provided in a radial intermediate space between the rings. Alternatively, the first ring and the second ring may be configured as rings which are offset coaxially with respect to one another in an axial direction and on the mutually facing axial sides of which the blocking contours are formed, wherein the blocking bodies and a switching finger which protrudes in a radial direction from the switching ring may be provided in an axial intermediate space between the rings. In the freewheel position of the switching element, the respective switching fingers may be positioned in a circumferential direction between two blocking bodies which are successive in the circumferential direction, preferably without making contact with the blocking bodies. In the blocking position, the switching element may have been rotated in one circumferential direction with respect to the preceding freewheel position in the circumferential direction until the blocking body has been clamped between the blocking contours and possibly the engaging switching finger. For the inactive position, the switching element may be rotated in the opposite circumferential direction until the switching finger engages on the other blocking body and pushes this down to such an extent that the blocking body can no longer engage into the second blocking contour. The first blocking contour offers sufficient space for the pushed-down blocking body in order that the blocking body can be pivoted through a sufficiently great pivot angle. The switching finger can in particular engage on two different blocking bodies which are arranged in succession in the circumferential direction, in order to realize the three switching positions of the freewheel. In particular, the switching element and/or the first ring and the second ring are configured to switch exclusively exactly three switching states. More than three switching states are not provided, and are also not necessary for the shifting of transmission gear ratios in the planetary transmission of the motor vehicle transmission, such that the structural design of the freewheel and the production costs can be kept low.

In particular, the second blocking contour has a slide ramp, which in the freewheel position can be caused to slide in one circumferential direction on the blocking body, and a blocking stop, which can be caused to abut in the other circumferential direction against the blocking body in order to block the rotational movement of the first ring with the second ring. In this way, freewheeling may be provided in one relative direction of rotation, which corresponds in particular to overrun operation, whereas blocking and a transmission of torque is provided in the opposite relative direction, which corresponds in particular to traction operation.

Preferably, the switching element has a blocking ramp, which acts in one circumferential direction so as to set the blocking element upright into the second blocking contour, and a holding contour, which acts in the other circumferential direction so as to hold the blocking element down against the first blocking contour. The gradient of the blocking ramp may in particular correspond to a gradient of a slide ramp of the second blocking contour, such that the blocking body, in the blocking position, can at one side lie areally against the slide ramp of the second blocking contour and/or can at the other side lie areally against the blocking ramp. The blocking body is thus received in the blocking position in a stable manner and can better support even relatively high torques to be transmitted. By means of the holding contour, the blocking body is merely held down, possibly counter the spring force of a spring element which engages on the blocking body, such that the holding contour can in particular engage merely linearly and not areally on the blocking body. Unnecessary friction resistances during the pushing-down of the blocking body can thus be avoided. Here, use is made of the recognition that the switching element engages at different tangential sides on a different blocking body for the respective switching position, such that the geometry of the respective tangential side can be optimized for the demand profile required in the respective switching position.

The switching element is particularly preferably coupled to an in particular electromechanically actuatable actuator for rotating the switching element. When a gear ratio change has been initiated, a signal for the gear ratio change can be processed in the actuator in order to switch the freewheel into the switching position that corresponds to the desired operating situation.

The actuator preferably has a rotatable switching drum with a guide groove which runs in particular in closed fashion in a circumferential direction, wherein the switching element has a guide pin which is inserted in the guide groove, wherein an axial relative movement of the guide pin with respect to the switching drum can be converted in the guide groove into a limited rotational movement of the switching element along its circumferential direction. Owing to the mechanical coupling of the switching drum, shifting of transmission gear ratios by means of the freewheel can be realized with little outlay in terms of construction and in a small structural space. By means of the switching drum, a particular sequence of transmission gear ratios can be mechanically positively specified, and incorrect shifting can be avoided. Furthermore, by means of the switching drum, a clutch for rotationally conjointly connecting two transmission components of the planetary transmission can simultaneously be actuated, such that the switching position of the freewheel is automatically adapted to the switching state of the clutch by means of mechanical positive coupling realized by way of the switching drum. Alternatively, the freewheel may be actuated by an actuator which has no switching drum, and instead of the switching drum has a differently configured control profile, which may for example be accessed electronically.

It is particularly preferable if the switching drum has a further guide groove, which runs in particular in closed fashion in a circumferential direction, for actuating a clutch element, in particular friction clutch and/or brake, which can be caused to engage on a transmission component of the planetary transmission. By means of the clutch element, it is possible in particular for a transmission ratio of the planetary transmission to be changed, for example in that, of the transmission components of the planetary transmission, a sun gear, a ring gear or a planet carrier can be rotationally conjointly coupled to another transmission component or can be held so as to be fixed against movement. By means of the same switching drum, both the freewheel and the clutch element can be actuated, such that switching of the freewheel and of the clutch element are positively coupled to one another by means of the switching drum. The switching of the freewheel and of the clutch element can thus be coordinated with one another, and faults arising from incorrect shifting can be avoided.

The invention furthermore relates to a motor vehicle transmission for coupling an electric machine to a drivetrain of an electrically driveable motor vehicle, having a planetary transmission for converting a torque that can be introduced by the electric machine, wherein the planetary transmission has, as transmission components, a sun gear, a ring gear arranged coaxially with respect to the sun gear, at least one planet gear which meshes with the sun gear and with the ring gear, and a planet carrier which bears the planet gear, a clutch for rotationally conjointly connecting two transmission components, in particular the ring gear to the planet carrier, and a switchable freewheel which may be designed and refined as described above, wherein the freewheel is configured to selectively bring about freewheeling and/or blocking of a transmission component, in particular of the sun gear, with respect to a reference component, in particular a static housing, during traction operation. By means of the blocking of the planetary transmission that can be intentionally brought about with the blocking setting, it is possible, with the aid of the freewheel that can be caused to assume three different switching positions, for a simple and structural-space-saving adaptation of the transmission characteristic of a planetary transmission of a motor vehicle transmission to different operating situations to be made possible.

In particular, a clutch sensor is provided for the actuation of the clutch, wherein the clutch sensor is configured to close the clutch only in the freewheel position of the switching element. Reliable upshifting of the motor vehicle transmission can thus be ensured. An unintended blockage of the motor vehicle transmission is thus avoided. In addition or alternatively, a sensor is provided for detecting the switching state of the freewheel. In this way, additional safety can be achieved if inherent mechanical safety is ensured, such that an upshift can be performed only when the blocking setting of the freewheel has been eliminated. In this case, a clutch sensor can be omitted.

The invention furthermore relates to the use of a freewheel, which may be designed and refined as described above, in a planetary transmission, which is operable as a transmission with 2 gear ratios, in a drivetrain of a motor vehicle, wherein, in particular, the planetary transmission is part of a motor vehicle transmission that may be designed and refined as described above. By means of the blocking of the planetary transmission that can be intentionally brought about with the blocking setting, it is possible, with the aid of the freewheel that can be caused to assume three different switching positions, for a simple and structural-space-saving adaptation of the transmission characteristic of the planetary transmission to different operating situations to be made possible.

BRIEF DESCRIPTION OF THE DRAWING FIGURES

Figure 2:
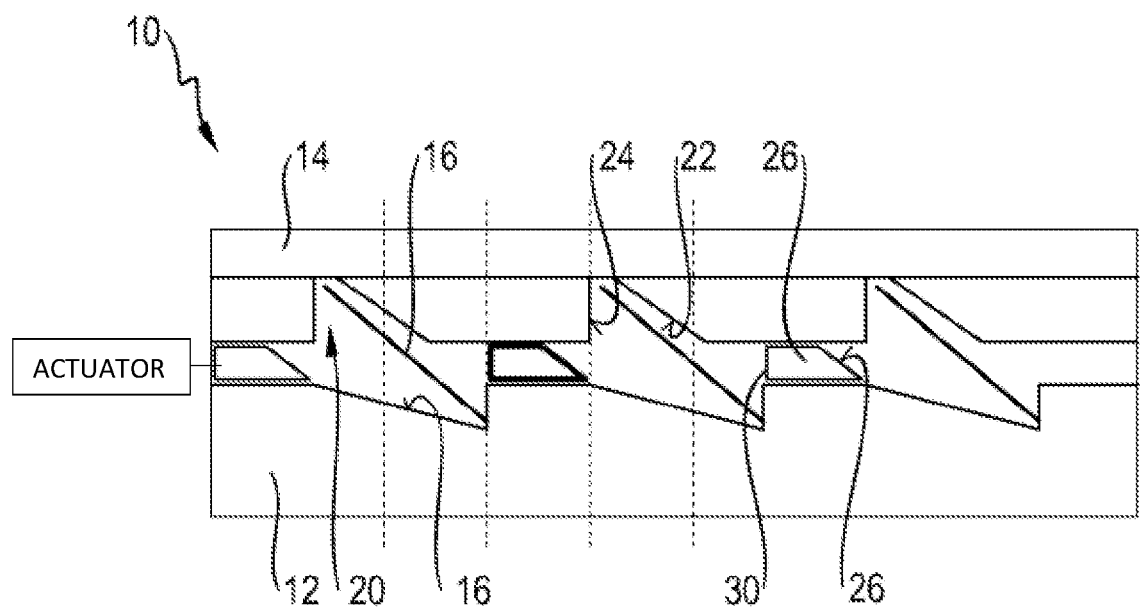
Figure 3:
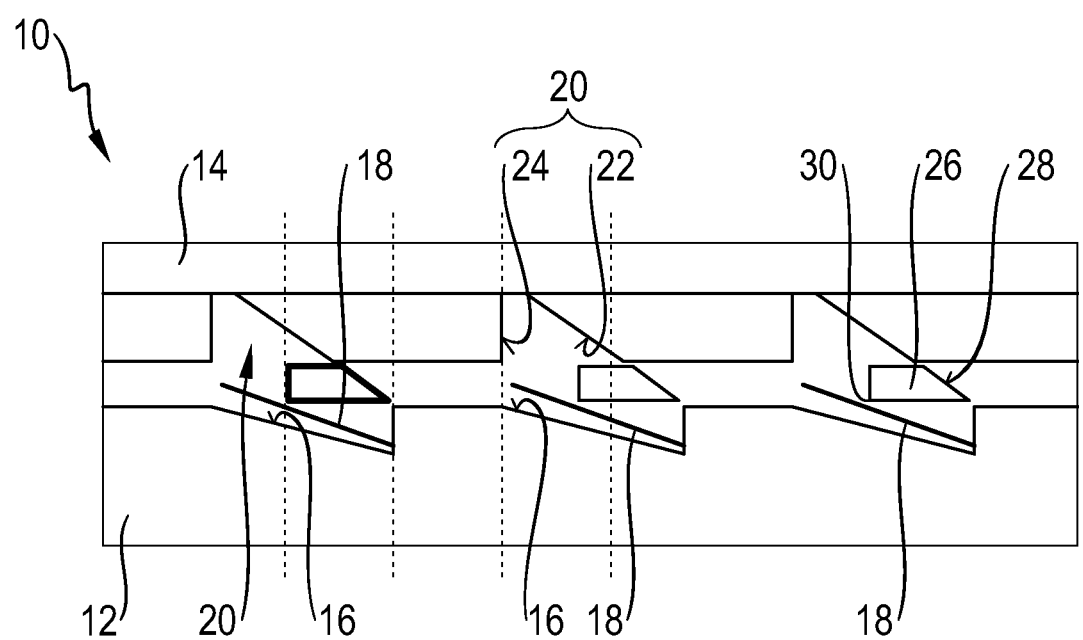

The invention is explained below by way of example with reference to the appended drawings on the basis of preferred exemplary embodiments, wherein the features presented below may in each case individually or in combination represent an aspect of the invention, in which:

FIG. 1 shows a schematic developed side view of a part of a freewheel in a blocking position, FIG. 2 shows a schematic developed side view of the freewheel from FIG. 1 in a freewheel position, and FIG. 3 shows a schematic developed side view of the freewheel from FIG. 1 in an inactive position.

DETAILED DESCRIPTION OF THE INVENTION

The freewheel 10 illustrated in a simplified illustration in FIG. 1 has a first ring 12, which is configured for example as an outer ring, and a second ring 14, which is configured coaxially with respect to the first ring 12 and so as to be relatively rotatable and for example as an inner ring. The freewheel 10 can be installed in a planetary transmission of a motor vehicle transmission in order, by means of a selective coupling of a transmission component of the planetary transmission to a housing, to change a transmission ratio of the planetary transmission and thus engage a different transmission gear ratio. For example, the first ring 12 is connected to the housing, whereas the second ring is connected to a sun gear of the planetary transmission.

The first ring 12 has a first blocking contour 16, in which a blocking body 18 configured as a pawl is mounted so as to be tiltable. The blocking body 18 can in particular be preloaded by means of a spring element in one of the tilting directions of the blocking body 18, in particular in the direction of the second ring 14. The second ring 14 has a second blocking contour 20 into which the free end of the blocking body 18 can engage. When the rings 12, 14 are arranged in a common axial region, the blocking contours 16, 20 can point toward one another in a radial direction. When the rings 12, 14 are arranged adjacent to one another in an axial direction, the blocking contours 16, 20 can point toward one another in an axial direction. The second blocking contour 20 has, on one tangential side, a slide ramp 22 on which the blocking body 18 can slide during a relative rotation without blocking the second ring 14 with the first ring 12 for a transmission of torque. On the opposite tangential side, the second blocking contour 20 has a blocking stop 24 on which the blocking body 18 can abut during an oppositely directed relative rotation and blocks the second ring 14 with the first ring 12 for a transmission of torque.

Provided between the first ring 12 and the second ring 14 is a rotatable switching element 26 for switching different operating modes for the freewheel 10. In the blocking position illustrated in FIG. 1, the switching element 26 lies with a blocking ramp 28 against the blocking body 18, such that the blocking body 18 is held immovably between the blocking ramp 28 of the switching element 26 and the slide ramp 22 of the second blocking contour 20. In the blocking position, the freewheel can transmit a torque, and couple the first ring 12 fixedly in terms of movement to the second ring 14, in both relative directions of rotation.

In the freewheel position illustrated in FIG. 2, the switching element 26 is positioned in a circumferential direction between two blocking bodies 18 without interacting with the blocking bodies 18. In the freewheel position, the blocking body 18 that can be caused to engage into the second blocking contour 20 can, in one relative direction of rotation, slide on the slide ramp 22 of the second blocking contour 20 and freewheel, whilst in the opposite relative direction of rotation, the blocking body 18 abuts against the blocking stop 24 of the second blocking contour 20 and blocks the first ring 12 with the second ring 14 in torque-transmitting fashion.

In the inactive position illustrated in FIG. 3, the switching element 26 has, by means of a holding contour 30 pointing away from the blocking ramp 28, pushed the blocking body 18 into the first blocking contour 16, such that the blocking body 18 has been held out of the second blocking contour 20. In this way, a transmission of torque between the first ring 12 and the second ring 14 is interrupted, and freewheeling is provided, in both relative directions of rotation.

What is claimed is:

1. A freewheel for changing a transmission characteristic of a planetary transmission for a motor vehicle transmission, said freewheel comprising:
   a first ring which has a first blocking contour,
   a second ring which is rotatable relative to the first ring and which has a second blocking contour, wherein each of the first and second blocking contours includes a vertical surface and an angled ramp surface, and
   tiltable blocking bodies which are configured to engage into the first blocking contour and into the second blocking contour, and
   a switching element for tilting the blocking bodies,
   wherein, in a blocking position of the switching element, the switching element clamps the blocking bodies immovably to the first blocking contour and to the second blocking contour, and wherein in the blocking position, each blocking body is pressed against the angled ramp surface of one of the second blocking contours,
   wherein, in a freewheel position of the switching element, the switching element allows unidirectional freewheeling, and
   wherein, in an inactive position of the switching element, the switching element holds the blocking bodies down on the first ring so as to be spaced apart from the second ring,
   wherein the switching element has a (i) blocking ramp, which acts in one circumferential direction so as to set one of the blocking bodies upright into the second blocking contour, and (ii) a holding contour, which acts in the other circumferential direction so as to hold said one of the blocking bodies down against the first blocking contour.

2. The freewheel as claimed in claim 1, wherein the second blocking contour has (i) a slide ramp, which, in the freewheel position, is configured to be caused to slide in one circumferential direction on the blocking body, and (ii) a blocking stop, which is configured to be caused to abut in the other circumferential direction against the blocking body in order to block a rotational movement of the first ring with the second ring.

3. The freewheel as claimed in claim 2, wherein the switching element is coupled to an electromechanically actuatable actuator for rotating the switching element.

4. The freewheel as claimed in claim 1, wherein the blocking ramp of the switching element runs substantially parallel to the angled ramp surface of the second blocking contour in the blocking position of the switching element.

5. The freewheel as claimed in claim 1, wherein the holding contour is a vertical surface and the blocking ramp is angled with respect to the vertical surface.

6. The freewheel as claimed in claim 1, wherein the first ring is an outer ring and the second ring is an inner ring.

7. The freewheel as claimed in claim 1, wherein the switching element is sandwiched between the first and second rings.

8. The freewheel as claimed in claim 1, wherein the switching element includes a plurality of trapezoidal shape elements, each trapezoidal shape element being configured to interact with one of the blocking bodies in the blocking position and a different one of the blocking bodies in the inactive position.

* * * * *